(12) United States Patent
Craven-Bartle (10) Patent No.: US 7,670,070 B2
(45) Date of Patent: Mar. 2, 2010

(54) MOUNTING OF IMAGING ARRANGEMENTS IN OPTICAL SYSTEMS

(75) Inventor: Thomas Craven-Bartle, Lund (SE)

(73) Assignee: Anoto AB (SE)

( * ) Notice: Subject to any disclaimer, the term of this patent is extended or adjusted under 35 U.S.C. 154(b) by 491 days.

(21) Appl. No.: 11/630,125

(22) PCT Filed: Jul. 7, 2005

(86) PCT No.: PCT/SE2005/001125

§ 371 (c)(1),
(2), (4) Date: Dec. 20, 2006

(87) PCT Pub. No.: WO2006/006925

PCT Pub. Date: Jan. 19, 2006

(65) Prior Publication Data

US 2008/0075396 A1 Mar. 27, 2008

Related U.S. Application Data

(60) Provisional application No. 60/586,083, filed on Jul. 8, 2004.

(30) Foreign Application Priority Data

Jul. 8, 2004 (SE) .................................. 0401802

(51) Int. Cl.
*G03B 17/00* (2006.01)
(52) U.S. Cl. ............. 396/529; 348/208.11; 348/208.99; 359/554; 250/227.13; 382/313
(58) Field of Classification Search ............. 396/52, 396/55, 529; 348/208.6, 208.11, 208.99; 359/554–557; 250/227.13; 382/313
See application file for complete search history.

(56) References Cited

U.S. PATENT DOCUMENTS

| | | | | | |
|---|---|---|---|---|---|
| 4,541,689 | A | * | 9/1985 | Howard et al. | 359/825 |
| 5,122,908 | A | * | 6/1992 | Sporer | 359/557 |
| 5,270,857 | A | * | 12/1993 | Oizumi et al. | 359/554 |
| 5,288,993 | A | * | 2/1994 | Bidiville et al. | 250/221 |

(Continued)

FOREIGN PATENT DOCUMENTS

EP 0 989 511 A2 3/2000

(Continued)

*Primary Examiner*—W. B. Perkey
*Assistant Examiner*—Warren K Fenwick
(74) *Attorney, Agent, or Firm*—Finnegan, Henderson, Farabow, Garrett & Dunner LLP (57) ABSTRACT

An optical system comprises an imaging arrangement (1', 1") that transmits an image to an image plane; a sensor; and one or more locator elements that locate the imaging arrangement (1', 1") to provide the image on the sensor. Tolerances of the locator element(s) allow a lateral translation and a rotation of the imaging arrangement (1'; 1") around a nominal rotation point. A parameter of the optical system is selected such that a movement, resulting from either the lateral translation or the rotation, of an optical axis (OA) on the sensor is at least partly counteracted by a movement, resulting from either the lateral translation or the rotation, of the image on the sensor with respect to the optical axis (OA). Thereby, the optical system is wholly or partly self-compensating with respect to tolerances affecting the angular position or the lateral position of the imaging arrangement.

22 Claims, 4 Drawing Sheets

U.S. PATENT DOCUMENTS

| | | | |
|---|---|---|---|
| 5,499,051 A * | 3/1996 | Suda et al. | 348/218.1 |
| 5,774,602 A | 6/1998 | Taguchi et al. | |
| 5,835,799 A | 11/1998 | Washisu | |
| 6,011,927 A | 1/2000 | Kamata | |
| 6,476,979 B1 * | 11/2002 | Schaack | 359/738 |
| 6,751,410 B1 | 6/2004 | Stavely | |
| 2002/0044260 A1 * | 4/2002 | Takahashi et al. | 353/31 |
| 2002/0148655 A1 * | 10/2002 | Cho et al. | 178/18.09 |
| 2003/0118394 A1 * | 6/2003 | King et al. | 401/195 |
| 2004/0179000 A1 * | 9/2004 | Fermgard et al. | 345/179 |
| 2005/0030297 A1 * | 2/2005 | Burstrom et al. | 345/179 |

FOREIGN PATENT DOCUMENTS

| | | |
|---|---|---|
| EP | 1 304 872 A1 | 4/2003 |
| WO | WO-03/001358 A1 | 1/2003 |
| WO | WO 03/025658 A1 * | 3/2003 |
| WO | WO 2005057471 A1 * | 6/2005 |

* cited by examiner

A MOUNTING OF IMAGING ARRANGEMENTS IN OPTICAL SYSTEMS

CROSS-REFERENCE TO RELATED APPLICATIONS

The present application claims the benefit of Swedish patent application No. 0401802-4 and U.S. provisional patent application No. 60/586,083, which were both filed on Jul. 8, 2004 and which are hereby incorporated by reference.

FIELD OF THE INVENTION

The present invention generally relates to optical systems for generating an image of an object, especially in miniaturized camera systems. Specifically, the invention relates to the mounting of an imaging arrangement in such an optical system.

BACKGROUND ART

Miniaturized camera systems are, for example, incorporated in handheld devices with imaging capability, such as barcode or text scanners, cameras, video recorders and electronic pens. Such camera systems generally include an imaging arrangement which defines an object plane and an image plane, whereby an object which is located within a field of view in the object plane is reproduced as an image in the image plane. The camera systems also include a radiation sensor which is essentially co-located with the image plane, to physically or electronically capture the image.

It may be important to precisely locate the image plane on the radiation sensor inter alia, to ascertain that the optical system produces an image of a well-defined part of the object plane. To this end, it may be necessary to keep both manufacturing and assembly tolerances of the optical system low. The absolute values of such tolerances may be very small in the case of compact imaging arrangements for handheld devices.

Assembly tolerances may be minimized by operatively engaging at least part of the imaging arrangement to the radiation sensor. For example, the imaging arrangement may include guiding surfaces that are designed to engage with corresponding surfaces on the radiation sensor to precisely locate the imaging arrangement with respect to the sensor, or vice versa. Applicant's international publication WO 03/001358 discloses an electronic pen with such an imaging arrangement. The camera system of the electronic pen is carried by a cylindrical stopper which is arranged in the front end of the pen. The imaging arrangement includes a tubular holder which contains optical components, such as one or more lenses, an aperture stop, a filter, etc. A pocket is formed at the rear end of the holder for form-fitted mounting of a two-dimensional radiation sensor, such as a CCD or CMOS sensor.

Such an optical system may require complex assembly steps in production, possibly involving manual labor. Further, the imaging arrangement has to be designed for a specific sensor geometry, resulting in a need for re-design whenever there is a change in the geometry of the sensor.

SUMMARY OF THE INVENTION

An object of the present invention thus is to provide a technique that allows for relaxation of tolerance requirements with respect to mounting of an imaging arrangement in an optical system.

Another object of the present invention is to provide a technique that allows for simple mounting of the imaging arrangement and/or the radiation sensor.

A still further object is to provide a technique that is capable of relaxing the geometric requirements on the radiation sensor.

These and other objects that will be evident from the following description are now achieved wholly or partly by an optical system, a handheld device, and methods according to independent claims 1, 17 and 18-20, respectively. Preferred embodiments are defined in the dependent claims.

BRIEF DESCRIPTION OF THE DRAWINGS

The invention will now be described by way of example with reference to the accompanying drawings, which schematically illustrate currently preferred embodiments.

DETAILED DESCRIPTION OF THE INVENTION

Figure 1:
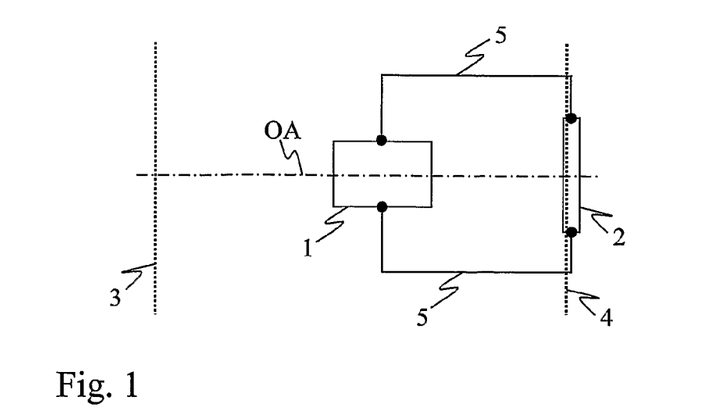
FIG. 1 is a generalized view of an optical system in which the present invention may be implemented.

FIG. 1 schematically illustrates an optical system with an imaging arrangement 1 that defines an object plane 3 and an image plane 4. An optical axis OA of the optical system extends between the object plane 3 and the image plane 4. A radiation sensor 2 is arranged essentially coincident with the image plane 3.

Ideally, imaging arrangements 1 are manufactured with identical optical characteristics in terms of effective focal length, field of view, magnification, etc. Also ideally, each imaging arrangement is exactly and optimally positioned with respect to the radiation sensor. In practice, however, tolerances act to introduce uncertainties in both the optical characteristics and the relative position of the imaging arrangement within the optical system. The positional tolerances typically occur in the mounting of the imaging arrangement and/or the radiation sensor.

Poor tolerance control may result in inadequate performance and/or high rejection rates in production of the device containing the optical system. Therefore, it is generally desired to minimize the chain of tolerances that affect the operation of the optical system. Conventionally, positional tolerances are minimized by providing a rigid and/or direct connection between the imaging arrangement and the radiation sensor, as indicated by connecting lines 5 in FIG. 1. For example, the positional tolerances may be controlled by the imaging arrangement being implemented as a unitary structure which is directly attached, and suitably form fitted, to the radiation sensor to minimize lateral and longitudinal variations in the relative position of the imaging arrangement/radiation sensor, as well as relative angular variations in the position of the imaging arrangement/radiation sensor.

The present invention goes in another direction, by designing the optical system to be wholly or partly self-compensating with respect to tolerances affecting the angular position of the imaging arrangement with respect to the radiation sensor. This allows for greater freedom in designing of the optical system. For example, it may be possible to dispense with the direct connection between the imaging arrangement and the radiation sensor.

Figure 2:
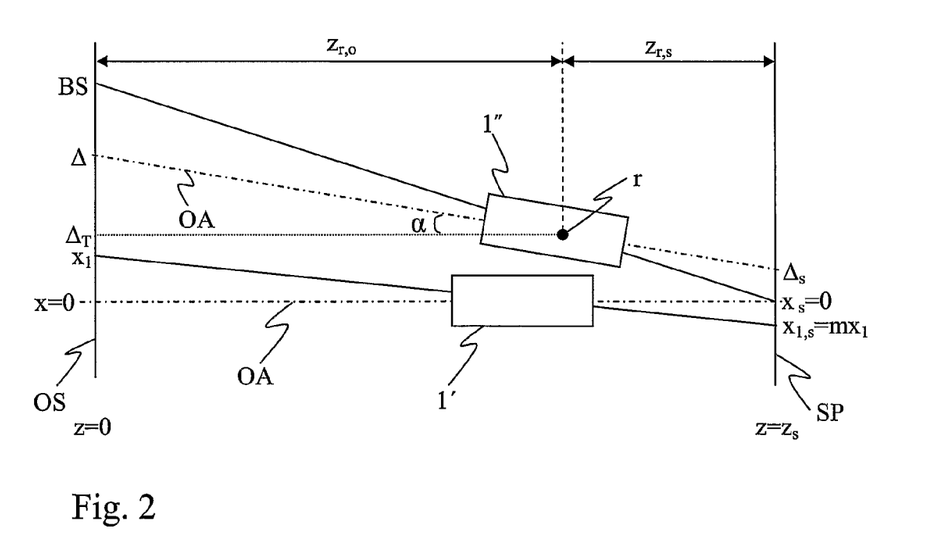
FIG. 2 illustrates the influence on the boresight of an optical system from rotation and translation of an imaging arrangement.

To illustrate the underlying principles of the present invention, FIG. 2 shows an imaging arrangement in an unperturbed position (indicated by reference numeral 1') and in a perturbed position (indicated by reference numeral 1") within an optical system. The unperturbed imaging arrangement 1' defines a nominal object plane, which is located to essentially coincide with an object surface OS, and an image plane, which is located to essentially coincide with a sensor plane SP in which the active area of a sensor (not shown) is arranged. In the unperturbed system, a point $x_1$ on the object surface OS is reproduced at a point $x_{1,s} = m \cdot x_1$ in the sensor plane SP, with m denoting the lateral magnification of the imaging arrangement. A negative m denotes that the image is inverted to the object (as in FIG. 2), and vice versa.

Below, the perturbations are defined with respect to a point on a global optical axis of the imaging arrangement. Such a "global optical axis" denotes the optical axis that extends from the object plane to the image plane. Within the imaging arrangement, the global optical axis is represented as a straight line that connects the entry and exit points of the optical axis of the system. It is to be understood that within the imaging arrangement, the global optical axis need not coincide with the actual radiation path defined by the components of the imaging arrangement.

Returning now to FIG. 2, the perturbations have resulted in both a lateral (x direction) and a longitudinal (z direction) shift of the imaging arrangement, as well as a rotation thereof around a rotation point r which is located on the global optical axis OA at a distance $z_{r,o}$ from the object surface OS and at a distance $z_{r,s}$ from the sensor plane SP. In the context of the present application, a lateral shift corresponds to the projection of a movement vector along the unperturbed or nominal global optical axis onto the image plane, whereas a longitudinal shift is parallel to the normal of the image plane, as projected along the nominal global optical axis.

Evidently, the global optical axis OA is translated and rotated as well, from its unperturbed or nominal extent, to intersect the object surface OS at $x = \Delta$ and the sensor plane at $x_s = \Delta_s$. The boresight BS of the perturbed imaging arrangement 1" is defined as the point on the object surface OS that is reproduced in the origin ($x_s = 0$) in the sensor plane SP. From FIG. 2, it should be clear that:

$$BS = \left| \Delta - \frac{\Delta_s}{m} \right| \quad (1)$$

Further it can be shown that:

$$\begin{cases} \Delta = \Delta_T - z_{r,o} \cdot \tan\alpha \\ \Delta_s = \Delta_T + z_{r,s} \cdot \tan\alpha \end{cases} \quad (2)$$

with $\Delta_T$ being the lateral translation of the imaging arrangement from the unperturbed to the perturbed position, and $\alpha$ being the rotation angle of the perturbed imaging arrangement.

Inserting Eqn. 2 in Eqn. 1 yields:

$$BS = \left| \Delta_T - z_{r,o} \cdot \tan\alpha - \frac{\Delta_T + z_{r,s} \cdot \tan\alpha}{m} \right| = \\ \left| \Delta_T \left( 1 - \frac{1}{m} \right) - \left( z_{r,o} + \frac{z_{r,s}}{m} \right) \cdot \tan\alpha \right| = |BS_T + BS_r| \quad (3)$$

with $BS_T$ being the boresight due to the translation and $BS_r$ being the boresight due to the rotation.

It can be noted that $BS_r$ is eliminated for:

$$\frac{z_{r,s}}{z_{r,o}} = -m \quad (4)$$

Figure 5A:
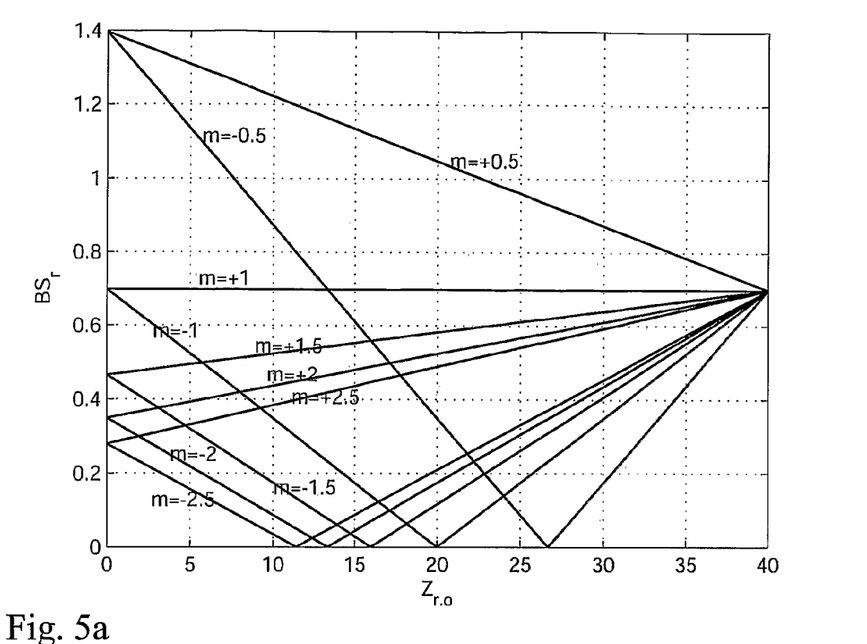
FIG. 5a is diagram of the boresight resulting from a rotation of 1° of the imaging unit in FIGS. 2-4, as a function of the distance between the rotation point of the imaging unit and the object surface, for different lateral magnifications of the imaging unit.

Thus, Eqn. 4 defines an optimum or target location of the center of rotation r of the perturbed imaging arrangement 1", in which the boresight BS is influenced by translation only. In other words, the imaging arrangement is wholly self-compensating with respect to rotation around the optimum location, i.e. a specific area of the object surface OS is reproduced as an image at a given and fixed location in the sensor plane SP, irrespective of any rotation of the imaging arrangement. FIG. 5a illustrates the dependence of the $BS_r$ component in Eqn. 3 on the distance between the rotation point r and the object surface OS ($z_{r,o}$), for different lateral magnifications (m). Clearly, for negative magnifications, it is possible to reduce the $BS_r$ component by locating the rotation point r sufficiently close to its optimum location.

Sufficiently close may denote that the resulting optical system is at least partly self-compensating, so that a rotation of the imaging arrangement results, in the sensor plane SP, in such a movement of the above-mentioned image relative to the optical axis OA that the movement of the optical axis OA in the sensor plane SP (cf. FIG. 2) is at least partly counteracted.

Alternatively, sufficiently close may denote that the boresight ($BS_r$) due to the rotation $\alpha$ is at most of the same order as the boresight ($BS_T$) due to the translation $\Delta_T$. In other words, the rotation point r is located such that the displacement, resulting from the rotation $\alpha$, of the above-mentioned image with respect to the given location in the sensor plane SP is no larger than a corresponding displacement resulting from the lateral translation $\Delta_T$.

By proper design of the connection between the imaging arrangement and the sensor, it is thus possible to accept increased misalignment of the imaging arrangement relative to the sensor. Consequently, the degree of freedom in design and assembly increases due to the increased independence between the imaging arrangement and the sensor. Also, the potential for fully automated assembly is increased.

An embodiment of the invention will now be described with reference to FIGS. 3-4. The invention is embodied in an electronic pen which has a camera system that captures images of a base on which the pen is operated. Positional information may then be determined based on the captured images, for example to track the motion of the pen on the base. The positional information, which may be relative or absolute, may be derived from inherent features of the base, such as naturally occurring surface irregularities, or from extrinsic features on the base, such as preprinted graphics/text and/or deposits made by the pen during its operation on the base and/or a dedicated position coding pattern. The positional information may be calculated either in the pen itself or in a receiving station connected to the pen.

FIGS. 3a-3d illustrate a modular unit 10 for such an electronic pen, and some basic parts thereof. The modular unit is a self-contained subassembly of the pen that can be tested for functionality and performance. During final assembly of the pen, the modular unit is enclosed in a pen shell. The modular unit is further described in Applicant's international patent publication WO 2005/057471, which is incorporated herein by reference.

The modular unit 10 includes an elongate carrier 12 which may support, directly or indirectly, all major interior components of the pen. One basic part of the modular unit 10 is a printed circuit board (PCB) 14 which carries the radiation sensor 16, a processor 18 and further electronic equipment (not shown). Another basic part is an imaging unit 20, which will be further described below.

Figure 3A:
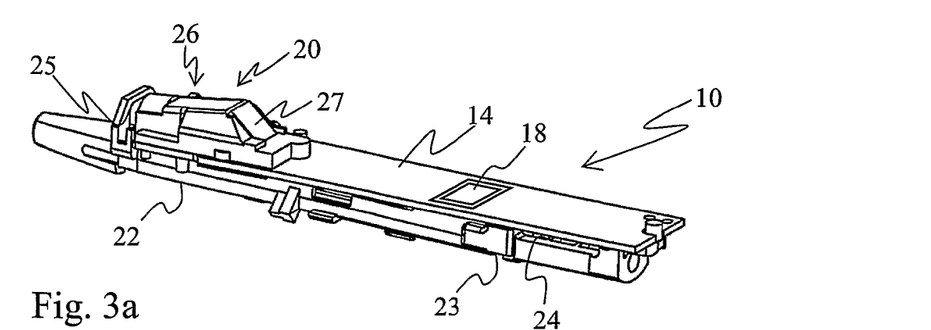
FIG. 3a is a perspective view of a pen subassembly for incorporation in an electronic pen, wherein the pen subassembly embodies the principles of the present invention.
Figure 3B:
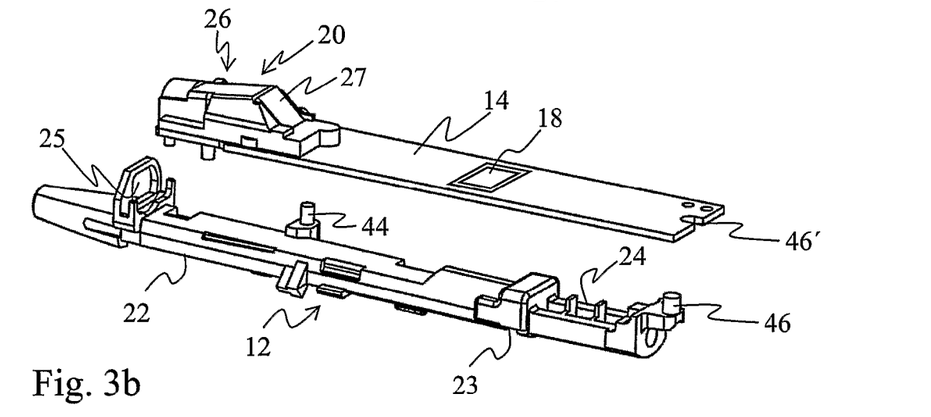
FIG. 3b is an exploded view of FIG. 3a, in which a carrier part has been separated from the pen subassembly.
Figure 3C:
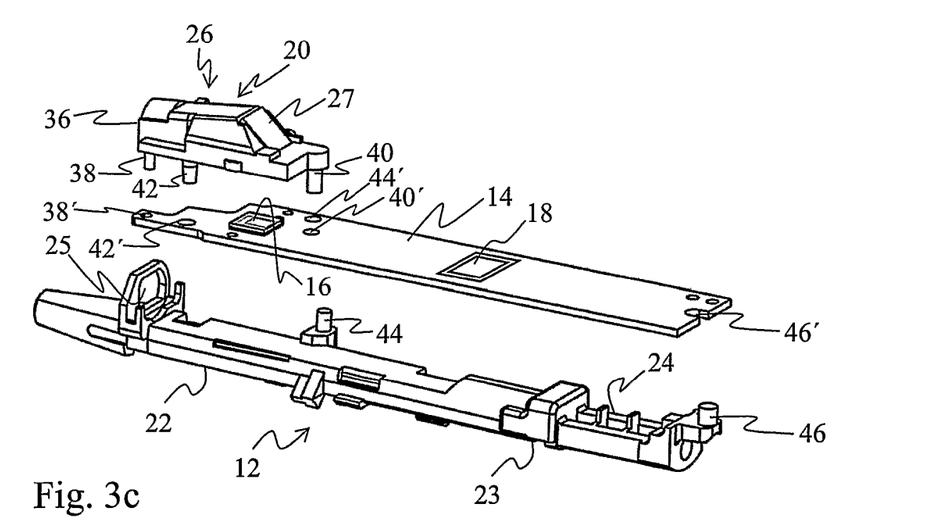
FIG. 3c is a further exploded view of FIG. 3b, in which an imaging unit has been separated from a substrate carrying an image sensor.

The carrier 12 provides mounting compartments 22-25 for, inter alia, a writing implement with a pen point, a contact sensor for the writing implement, a vibrator for user feedback, a battery for powering the processor and any further electronic components, and an optical window for protecting the interior of the pen. The writing implement may, but need not, be designed to physically mark the base when the pen is operated thereon.

The pen has an optical system which includes the imaging unit 20, the radiation sensor 16 and an irradiating arrangement 26. The radiation sensor 16 operates, under the control of the processor 18, to capture images within a field of view on the base, for a specified range of inclination angles of the electronic pen, while the irradiating arrangement 26 operates, under the control of the processor 18, to illuminate relevant parts of the field of view on the base.

The radiation sensor 16 may be an electro-optical two-dimensional image sensor, typically based on CCD or CMOS technology, which is mounted on the PCB 14 and is electrically connected thereto. In one embodiment, the radiation sensor comprises a sensor chip and a surrounding package which is soldered to the PCB. In another embodiment, the sensor chip may be attached directly to the PCB, for example via wedge or ball bonding.

Figure 3D:
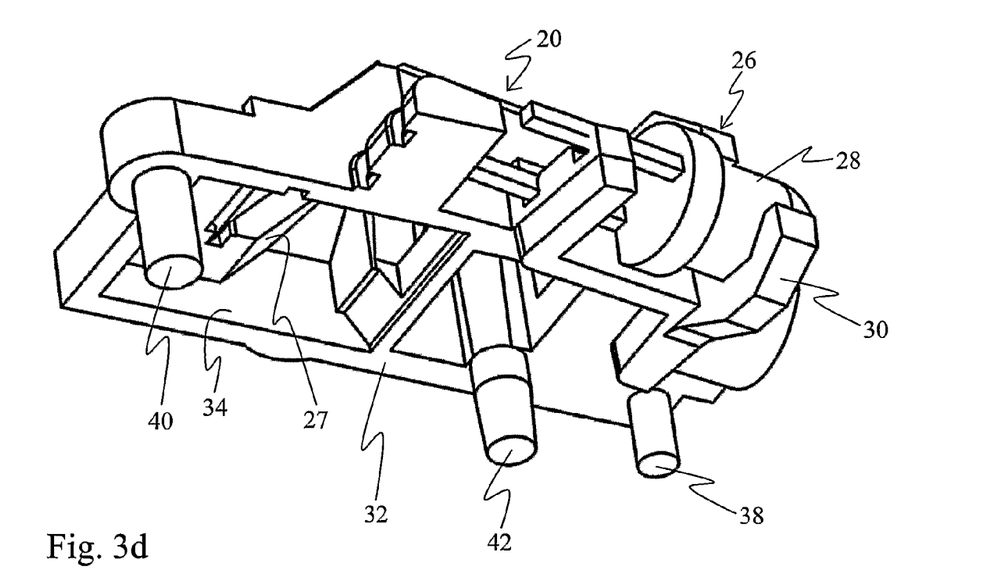
FIG. 3d is a perspective view of the imaging unit of FIG. 3c.

The imaging unit 20 contains at least one imaging lens (not shown), an aperture stop (not shown), and at least one redirecting mirror surface 27. The imaging unit 20 is a unitary component which may be manufactured in one piece or assembled from separate elements. The imaging unit 20 defines an object plane, an image plane, an optical axis, and a depth of field in the object plane. The optical system is designed with a field of view which is large enough to capture sufficient information to enable successful position determination. The field of view may be given by the active area of the radiation sensor 16, or be set by a field stop (not shown) of the optical system. The combination of the field of view and the depth of field defines a detection volume in and around the object plane. For reasons given below, the detection volume should have a well-defined location with respect to the pen point.

Generally speaking, the irradiating arrangement 26 typically includes a radiation source 28, such as a light-emitting diode (LED) or a laser diode. As shown in FIG. 3d, the radiation source 28 may be attached to the imaging unit. Alternatively, the radiation source may be mounted on and be electrically connected to the PCB. Optionally, the irradiating arrangement may include a light guide to direct the emitted radiation onto the base. The irradiating arrangement is arranged to illuminate the base sufficiently for all relevant pen inclination angles.

Generally, it is desirable for the detection volume to be located adjacent to or around the pen point, since this will minimize the required depth of field.

Further, if the positional information is derived in absolute positions on the base, it may be desirable to have the positional information indicate the locus of the pen tip. With a known offset distance between the pen point and the detection volume, any position derived from an image may be correspondingly transformed into an absolute pen point position. Further, if the pen point is visible in the images of the base, the absolute position of the pen point may be directly derived from such images.

However, the relative location of the detection volume to the pen point may vary from one modular unit to another, due to tolerances. Thus, it may be necessary to individually calibrate each pen/modular unit, to account for the individual offset distance of each pen. If the optical system is designed such that the pen point is visible in the images for calibration purposes, tolerances may operate to move the pen point outside the field of view, thereby obliterating any opportunities for inherent calibration. Still worse, the pen point may end up obscuring the base within the field of view to such a degree that the success rate in position determination becomes unacceptably low.

Figure 4:
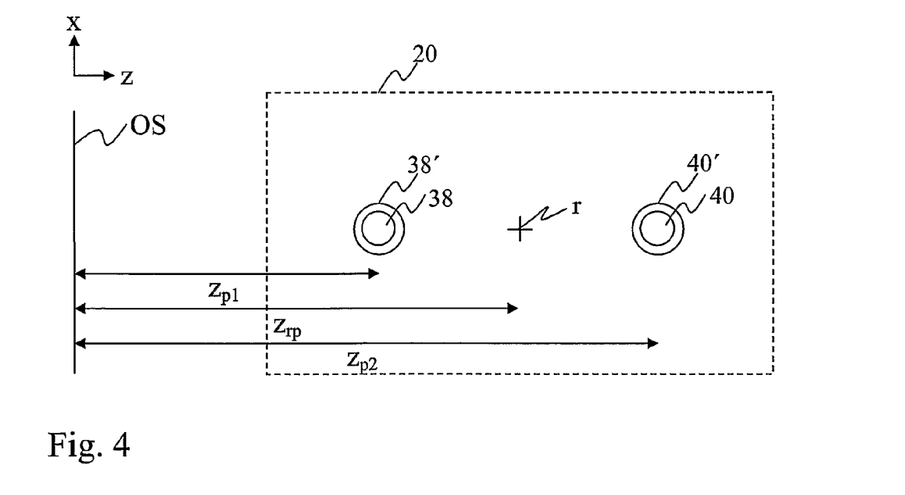
FIG. 4 illustrates one embodiment of connecting an imaging unit to a substrate.

To mitigate these adverse effects, the connection between the imaging unit and the sensor is implemented in accordance with the aforesaid principles, as will be further explained with respect to FIGS. 3-4.

In the embodiment of FIGS. 3-4, the imaging unit 20 is designed to be mounted on the PCB 14, with a given relation to the sensor 16 thereon. The PCB 14, in turn, is designed to be mounted on the carrier 12. A holder 30 is integrated with the imaging unit 20 to provide for mounting of the aforesaid radiation source 28 (FIG. 3d), in this case an LED, which is electrically connected to the PCB. Integrating the holder 30 in the imaging unit 20 minimizes the influence of assembly tolerances on the relative location of the field of view and the illuminated area on the object surface.

The imaging unit 20 has a bottom surface 32 with a radiation outlet 34, which is adapted to face the surface of the PCB 14 in suitable alignment with the sensor 16, and a distal end with a radiation inlet 36 (FIG. 3c) facing the optical window (cf. holder 25 in FIGS. 3a-3c). The outlet 34 is dimensioned with clearance to the sensor 16, since the positional control of the imaging unit does not rely on any guiding contact with the sensor. Thus, one and the same imaging unit may accommodate sensors of different type and/or geometry.

A radiation path is defined between the inlet 36 and the outlet 34 and is confined within the imaging unit 20. The bottom surface 32 has two projecting guiding pins 38, 40, which cooperate with corresponding guiding holes 38', 40' in the PCB 14 to define the placement of the imaging unit 20 on the PCB 14. The guiding pins 38, 40 are arranged according to the principles of the present invention, i.e. to reduce the influence of any angular mounting variations due to tolerances. In the illustrated embodiment, the imaging unit 20 is fixed to the PCB 14 by deformation of a supplementary fixation pin 42 in a corresponding through hole 42' on the PCB 14. Alternatively or additionally, fixation may be achieved by deformation of one or both of the guiding pins 38, 40. Alternatively or additionally, use may be made of external clamping fixtures and/or welding, gluing, form fitting, press fitting, snap fitting, etc.

Further, the PCB 14 is fixed to the carrier 12 by deformation of supplementary fixation pins 44, 46 on the carrier 12 in corresponding through holes 44', 46' on the PCB 14. Alternatively or additionally, use may be made of external clamping fixtures and/or welding, gluing, form fitting, press fitting, snap fitting, etc.

The mutual placement of the guiding pins 38, 40 will define the center point of any rotation that occurs due to tolerances of the guiding pins 38, 40 and the guiding holes 38', 40', as will be further described with reference to FIG. 4. In the example of FIG. 4, the geometric centers of the guiding pins 38, 40 are spaced from the object surface OS by $z_{p1}$ and $z_{p2}$, respectively. The nominal center of rotation r will then be located at $z_{rp} = (z_{p1} + z_{p2})/2$. The following design values and tolerances will affect the imaging unit 20 in FIG. 4:

$r_{play}$: the nominal radial play between a pin and a hole
$T_{hp}$: the tolerance in the x direction of the hole placement in relation to the PCB
$T_{pp}$: the tolerance in the x direction of the pin placement in relation to the imaging unit
$T_{hd}$: the tolerance of the hole diameter
$T_{pd}$: the tolerance of the pin diameter The maximum relative displacement $T_{ph}$ between the geometric centers of the pin and its corresponding hole is:

$$T_{ph} = r_{play} + \frac{T_{hd} + T_{pd}}{2} \quad (6)$$

The use of guiding pins 38, 40 according to FIG. 4 allows the imaging unit 20 to attain two different extremes: pure lateral translation and pure rotation, and any intermediate states.

Pure lateral translation of the imaging unit 20, accounting for tolerances, results in a boresight of:

$$BS_T = (T_{ph} + T_{pp} + T_{hp}) \cdot \left(1 - \frac{1}{m}\right) \quad (7)$$

If one of the guiding pins 38, 40 is pressed upwards and the other downwards, or vice versa, a pure rotation of the imaging unit 20 is obtained in relation to the object surface OS. The resulting maximum rotation angle, accounting for tolerances, is:

$$\alpha_{max} \approx \arctan\left(\frac{2(T_{ph} + T_{pp} + T_{hp})}{z_{pp}}\right) \quad (8)$$

with $z_{pp}$ being the distance between the pins, i.e. $z_{p2} - z_{p1}$.

The intermediate states may be assumed to result in a smaller boresight than the extremes. Thus, the extremes yield the worst case boresight. If the optical system has been designed with tolerances that yield an acceptable translation boresight ($BS_T$), then the rotation boresight ($BS_r$) need not be reduced below the translation boresight, i.e., if needed or desired, the center of rotation may be placed with a corresponding deviation from the aforesaid optimum location.

In one embodiment, the system is designed with a magnification of −0.5 and with tolerances of the guiding pin arrangement yielding a maximum boresight due to lateral translation ($BS_T$) of 0.600 mm. Further, the imaging unit is designed with a maximum rotation angle ($\alpha_{max}$) of about 1.4°. Such a maximum angle of rotation would result in an uncompensated boresight due to rotation of 0.775 mm. However, in this example, by adequate placement of the guiding pins ($z_{p1}$=23 mm, $z_{p2}$=39 mm), the boresight due to rotation ($BS_r$) is reduced to 0.575 mm.

In one variant, the imaging unit 20 is forced away from the extreme of pure translation, preferably, to the other extreme of pure rotation, at which the boresight is carefully controlled. Such a forced mounting may be achieved by applying external rotating forces during mounting of the imaging unit 20 to the PCB 14 and/or by providing the imaging unit 20 with guiding surfaces that interact with corresponding guiding surfaces on the PCB 14 to prevent the imaging unit 20 from being purely translated laterally. The arrangement of guiding pins 38, 40 according to FIG. 4 results in an essentially bistable mount, and such guiding surfaces may effectively push the imaging unit into the extreme of pure rotation.

It should be noted that the above reasoning is equally applicable for guiding pins 38, 40 that are spaced both longitudinally (z direction) and transversely (x direction) on the imaging unit 20, for example as illustrated in the embodiment of FIG. 3.

Figure 5B:
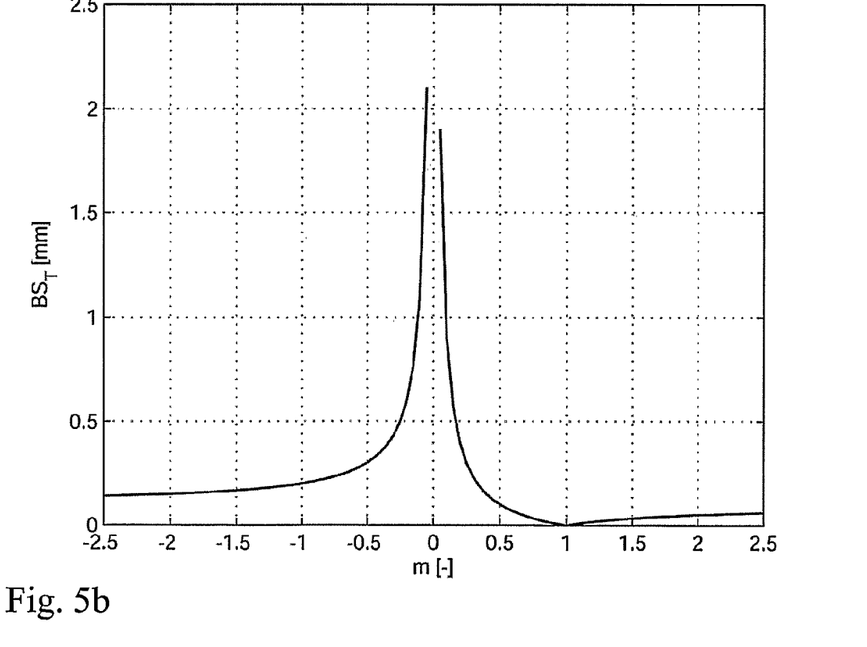
FIG. 5b is a diagram of the boresight resulting from a 0.1 mm lateral translation of the imaging unit in FIGS. 2-4, as a function of the lateral magnification of the imaging unit.

Returning to Eqn. 3, it may be noted that an optical system may be designed to be self-compensating with respect to lateral translation, instead of rotation, by the lateral magnification being sufficiently close to +1. FIG. 5b illustrates the $BS_T$ component of Eqn. 3 as a function of magnification, for tolerances yielding a lateral translation of 0.1 mm. Analogous to the previous discussion, sufficiently close may denote that the resulting optical system is at least partly self-compensating, so that a lateral translation of the imaging arrangement results, in the sensor plane, in such a movement of the image relative to the optical axis that the movement of the optical axis in the sensor plane is at least partly counteracted. Alternatively, sufficiently close may denote that the boresight due to the lateral translation is at most of the same order as the boresight due to any rotation. The advantages and features discussed above in relation to rotation compensation are equally applicable to such translation compensation. Thus, proper design of the lateral magnification of the imaging arrangement may allow for increased misalignment of the imaging arrangement relative to the sensor. Consequently, the degree of freedom in design and assembly increases due to the increased independence between the imaging arrangement and the sensor. Also, the potential for fully automated assembly is increased.

There are many variations that may be made consistent with the present invention. The foregoing description is presented for purposes of illustration and explanation. It is not exhaustive and does not limit the invention to the precise form disclosed. Modifications and variations are possible in light of the above teachings or may be acquired from practicing the invention.

In one alternative embodiment (not shown), the imaging unit may be supported by the PCB without being directly attached thereto. Here, the PCB with the radiation sensor may rest on one side of the elongate carrier. The imaging unit may have two protruding guiding pins, each penetrating a dedicated through hole in the PCB and being received in a corresponding bore in the carrier. As mounted, the imaging unit may be pressed against the PCB, to thereby minimize any variations in the position of the imaging unit in the normal direction of the radiation sensor. The imaging unit may be fixed to the carrier by deformation of the guiding pins in the bores. Alternatively or additionally, fixation may be achieved via fixation pins, external clamping fixtures and/or welding, gluing, form fitting, press fitting, snap fitting, etc. Again, the mutual placement of the guiding pins will define the center point of any rotation that occurs due to tolerances of the guiding pins, the through holes, and the receiving bores.

It should also be noted that a greater or lesser number of guiding pins may be used. For example, a single guiding pin may be used to define the center of rotation, in combination with a rotation limiting element, for example cooperating abutment surfaces on the imaging arrangement and the carrier and/or PCB. Still further, the guiding pin(s) on the imaging arrangement may be exchanged for, or supplemented by, guiding bore(s) for cooperation with at least one guiding pin projecting from the PCB or the carrier. Alternatively, the pin-hole arrangement may be substituted for elongate guiding ribs that cooperate with corresponding guiding surfaces. For example, at least two mutually non-parallel and spaced guiding ribs or surfaces could be provided on the imaging arrangement to locate it with a defined rotation point on the PCB. In yet another alternative, the imaging arrangement is not physically guided on the PCB during mounting. Instead, the PCB may be provided with a visual reference for cooperation with a corresponding visual reference on the imaging arrangement. An automated assembly system with machine vision capability may then be controlled to align these visual references during mounting, the tolerances in this automated mounting process operating to center any rotation sufficiently close to the aforesaid optimum rotation point. Such a visual reference may be an outline on the PCB for cooperation with the base profile of the imaging unit, or a number of cooperating markings on the PCB and the imaging unit.

It is also conceivable to have a "floating mount" between imaging arrangement and the carrier/PCB, i.e. the imaging arrangement being free to rotate, within a limited range of angles.

Further, the imaging arrangement may interface with other substrates than the above-mentioned PCB, such as thick film hybrids of metal or ceramic material, or wire wraps.

The invention claimed is:

1. An optical system, comprising:
    an imaging arrangement defining an optical axis extending longitudinally between an object plane and an image plane, where the imaging arrangement transmits an image from the object plane to the image plane;
    a substrate with a sensor device; and
    at least one locator element that positions the imaging arrangement to provide the image on the sensor device, wherein tolerances of said at least one locator element operate to allow a lateral translation of the imaging arrangement from a nominal location and a rotation of the imaging arrangement around a nominal rotation point, and wherein a parameter of the optical system is selected such that a deviation of the optical axis on the sensor device resulting from one of said lateral translation and said rotation during assembly of the optical system is at least partly counteracted by a movement, resulting from said one of said lateral translation and said rotation, of the image on the sensor device with respect to the optical axis.

2. The optical system of claim 1, wherein said deviation results from said rotation of the imaging arrangement, and wherein said parameter is representative of a location of said nominal rotation point within the optical system.

3. The optical system of claim 2, wherein said nominal rotation point is located relative to a target rotation point which defines a first distance to the sensor device and a second distance to the object plane, the ratio between the first distance and the second distance being equal to the lateral magnification of the imaging arrangement.

4. The optical system of claim 2, wherein said location is selected so that the displacement of the image with respect to the sensor device, resulting from said movements, at most is of the same order as a corresponding displacement resulting from said lateral translation.

5. A method of assembling the optical system of claim 2, comprising:
    locating the imaging arrangement with respect to the sensor device by means of said at least one locator element promoting said rotation; and
    securing the imaging arrangement to the substrate.

6. The optical system of claim 1, wherein said deviation results from said lateral translation of the imaging arrangement, and wherein said parameter is representative of a lateral magnification of the imaging arrangement.

7. The optical system of claim 6, wherein said lateral magnification is selected with respect to a target value of +1.

8. The optical system of claim 6, wherein said lateral magnification is selected so that the displacement of the image with respect to the sensor device, resulting from said movements, at most is of the same order as a corresponding displacement resulting from said rotation.

9. A method of assembling the optical system of claim 6, comprising:
    locating the imaging arrangement with respect to the sensor device by means of said at least one locator element promoting said lateral translation; and
    securing the imaging arrangement to the substrate.

10. The optical system of claim 1, wherein said at least one locator element is designed with said tolerances operating in a bi-stable manner to result in either said rotation or said lateral translation of the imaging arrangement with respect to the sensor device.

11. The optical system of claim 1, wherein the imaging arrangement is of unitary construction.

12. The optical system of claim 11, wherein the imaging arrangement comprises a housing with at least one imaging component therein.

13. The optical system of claim 12, wherein the housing comprises a holder for a radiation source that illuminates a dedicated area of the object plane.

14. The optical system of claim 1, wherein each locator element is spaced from the sensor device.

15. The optical system of claim 1, wherein said rotation defines a plane of rotation, and wherein the optical system operates essentially without engagement forces between the imaging arrangement and the sensor device in said plane of rotation.

16. The optical system of claim 1, wherein the imaging arrangement is directly or indirectly secured to the substrate.

17. The optical system of 1, wherein said at least one locator element comprises at least one pair of cooperating guiding surfaces.

18. The optical system of claim 17, wherein one guiding surface of said pair is provided on the imaging arrangement and another guiding surface of said pair is provided on the substrate.

19. The optical system of claim 1, wherein the substrate comprises a printed circuit board having the sensor device arranged thereon.

20. The optical system of claim 19, wherein the substrate further comprises a carrier element which provides a pointer for interaction with an object surface located at the object plane.

21. A modular unit for a handheld device, comprising
an imaging arrangement defining an optical axis extending longitudinally between an object plane and an image plane, where the imaging arrangement transmits an image from the object plane to the image plane;
a substrate with a sensor device and a processor; and
at least one locator element that positions the imaging arrangement to provide the image on the sensor device, wherein tolerances of the at least one locator element operate to allow a lateral translation of the imaging arrangement from a nominal location and a rotation of the imaging arrangement around a nominal rotation point, and wherein a parameter of the optical system is selected such that a deviation of the optical axis on the sensor device resulting from one of the lateral translation and the rotation during assembly of the optical system is at least partly counteracted by a movement, resulting from said one of the lateral translation and the rotation, of the image on the sensor device with respect to the optical axis.

22. A method of manufacturing an optical system, comprising:
providing an imaging arrangement which defines at least part of an optical axis that extends longitudinally between an object plane and an image plane and which transmits an image from the object plane to the image plane;
providing a substrate which includes a sensor device;
providing at least one locator element that positions the imaging arrangement to provide the image on the sensor device, wherein tolerances of said at least one locator element operate to allow a lateral translation of the imaging arrangement from a nominal location and a rotation of the imaging arrangement around a nominal rotation point; and
selecting a parameter of the optical system such that a deviation of the optical axis on the sensor device resulting from one of said lateral translation and said rotation during assembly of the optical system is at least partly counteracted by a movement, resulting from said one of said lateral translation and said rotation, of the image on the sensor device with respect to the optical axis.

* * * * *